US011982105B2

(12) United States Patent
Eickhoff et al.

(10) Patent No.: US 11,982,105 B2
(45) Date of Patent: May 14, 2024

(54) ELECTRIC LATCH MECHANISM

(71) Applicant: Schlage Lock Company LLC, Carmel, IN (US)

(72) Inventors: Brian C. Eickhoff, Danville, IN (US); Brady Plummer, Fishers, IN (US); Benjamin L. Miller, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 1 day.

(21) Appl. No.: 17/857,712

(22) Filed: Jul. 5, 2022

(65) Prior Publication Data

US 2023/0125306 A1 Apr. 27, 2023

Related U.S. Application Data

(63) Continuation of application No. 16/299,314, filed on Mar. 12, 2019, now Pat. No. 11,377,873.

(51) Int. Cl.

*E05B 17/20* (2006.01)
*E05B 47/00* (2006.01)
(Continued)

(52) U.S. Cl.

CPC ...... *E05B 17/2011* (2013.01); *E05B 47/0012* (2013.01); *E05B 47/06* (2013.01);
(Continued)

(58) Field of Classification Search

CPC ............. E05Y 2900/132; Y10T 292/57; Y10T 292/14; Y10T 403/592; E05B 63/121;
(Continued)

(56) References Cited

U.S. PATENT DOCUMENTS

| | | | |
|---|---|---|---|
| 2,070,149 | A | 2/1937 | Turner |
| 2,679,428 | A | 5/1954 | Rop |

(Continued)

FOREIGN PATENT DOCUMENTS

| | | |
|---|---|---|
| WO | 2011003546 A1 | 1/2011 |
| WO | 2017142908 A1 | 8/2017 |

OTHER PUBLICATIONS

International Search Report; International Searching Authority; International Application No. PCT/US2020/022373; dated Jun. 12, 2020; 4 pages.

(Continued)

*Primary Examiner* — Mark A Williams
(74) *Attorney, Agent, or Firm* — Taft Stettinius & Hollister LLP

(57) ABSTRACT

An exemplary latchbolt assembly includes a latchbolt, a locking sleeve, and a roller engaged between the latchbolt and the locking sleeve. The latchbolt is configured to drive the roller from a first position to a second position as the latchbolt moves from a projected position to a depressed position. The locking sleeve includes a blocking surface and a recessed portion. When the blocking surface is aligned with the roller, the locking sleeve retains the roller in the first position, thereby retaining the latchbolt in the projected position. When the recessed portion is aligned with the roller, the locking sleeve permits movement of the roller from the first position to the second position, thereby enabling depression of the latchbolt.

20 Claims, 7 Drawing Sheets

(51) Int. Cl.
*E05B 47/06* (2006.01)
*E05B 55/00* (2006.01)

(52) U.S. Cl.
CPC ...... *E05B 47/0603* (2013.01); *E05B 47/0607* (2013.01); *E05B 55/005* (2013.01); *E05Y 2900/132* (2013.01)

(58) Field of Classification Search
CPC .. E05B 15/006; E05B 17/2011; E05B 15/102; E05B 67/365; E05B 47/0012; E05B 47/06; E05B 47/0603; E05B 47/0607; E05B 55/005; E05B 55/12
See application file for complete search history.

(56) References Cited

U.S. PATENT DOCUMENTS 3,261,630 A * 7/1966 Chew ...................... E05B 63/18 70/216
3,835,674 A * 9/1974 Hoyt ..................... E05B 67/365 70/34
3,912,309 A 10/1975 Fischer et al.
3,946,581 A 3/1976 Weeks et al.
4,086,794 A 5/1978 Richards
4,543,807 A * 10/1985 Swisher ................ E05B 67/365 70/386
4,664,433 A 5/1987 Solovieff
5,040,652 A * 8/1991 Fish ........................ E05C 1/163 70/472
5,664,445 A 9/1997 Chang
5,746,458 A 5/1998 Fisher
5,787,744 A 8/1998 Berger et al.
5,907,963 A 6/1999 Myers et al.
6,125,673 A 10/2000 Luker
6,318,138 B1 11/2001 Mathews et al.
6,351,976 B1 3/2002 Chen
6,412,320 B1 7/2002 Maniago
6,619,078 B1 9/2003 Reese
7,065,993 B2 * 6/2006 Fukushima ....... B60R 25/02153 70/252
7,125,058 B2 10/2006 Hawthorne
7,377,137 B1 5/2008 Bednarz
7,775,071 B2 8/2010 Agbay
8,151,604 B2 4/2012 Thomas et al.
8,556,304 B2 10/2013 Chung et al.
9,528,297 B2 12/2016 Gentile
9,926,723 B2 3/2018 Mackle
9,932,756 B1 4/2018 Nickeas et al.
10,024,082 B2 * 7/2018 Marsh ..................... E05B 37/00
2001/0019212 A1 9/2001 Fujiwara
2002/0134120 A1 9/2002 Davis
2006/0071484 A1 * 4/2006 Chen ..................... E05B 63/121 292/336.3
2006/0208509 A1 9/2006 Bodily
2007/0290514 A1 * 12/2007 Halac ...................... E05B 63/06 292/337
2008/0012360 A1 1/2008 Engel et al.
2008/0078220 A1 4/2008 Kim
2008/0178640 A1 7/2008 Davis
2009/0229324 A1 9/2009 Stachowiak
2012/0167369 A1 * 7/2012 Holcomb ................ E05B 19/00 29/428
2014/0053386 A1 2/2014 Holcomb et al.
2014/0197645 A1 7/2014 Lu et al.
2017/0204637 A1 * 7/2017 Matyko ................... E05B 67/02
2017/0275926 A1 9/2017 Kumar et al.
2017/0342742 A1 * 11/2017 Snodgrass ........... E05B 47/0047

OTHER PUBLICATIONS

Written Opinion of the International Searching Authority; International Searching Authority; International Application No. PCT/US2020/022373; dated Jun. 12, 2020; 5 pages.
Canadian Examination Report; Canadian Intellectual Property Office; Canadian Application No. 3,133,352; dated Nov. 30, 2022; 3 pages.
Extended European Search Report; European Patent Office; European Application No. 20770260.6; dated Nov. 10, 2022; 6 pages.

* cited by examiner

ELECTRIC LATCH MECHANISM

CROSS REFERENCE TO RELATED APPLICATIONS

This application is a continuation of U.S. patent application Ser. No. 16/299,314 filed Mar. 12, 2019 and issued as U.S. Pat. No. 11,377,873, the contents of which are hereby incorporated herein by reference in their entirety.

TECHNICAL FIELD

The present disclosure generally relates to latch mechanisms, and more particularly but not exclusively relates to latch mechanisms for locksets.

BACKGROUND

In situations in which electronic access control to a doorway is desired, there are typically two primary options that may be pursued. The first option is to install an electronic access control device such as an electric strike to the doorframe, while the second option involves installing an electronic access control device such as an electrified lockset to the door itself. While electric strikes allow for a more seamless push/pull operation of the door by removing the need to rotate a door handle, electric strikes can be difficult and costly to retrofit into existing doorframes. Conversely, electronic locksets can easily be installed to an existing door, but typically require that the user rotate the handle in order to retract the latchbolt even when the lockset is in the unlocked state. For these reasons among others, there remains a need for further improvements in this technological field.

SUMMARY

An exemplary latchbolt assembly includes a latchbolt, a locking sleeve, and a roller engaged between the latchbolt and the locking sleeve. The latchbolt is configured to drive the roller from a first position to a second position as the latchbolt moves from a projected position to a depressed position. The locking sleeve includes a blocking surface and a recessed portion. When the blocking surface is aligned with the roller, the locking sleeve retains the roller in the first position, thereby retaining the latchbolt in the projected position. When the recessed portion is aligned with the roller, the locking sleeve permits movement of the roller from the first position to the second position, thereby enabling depression of the latchbolt. Further embodiments, forms, features, and aspects of the present application shall become apparent from the description and figures provided herewith.

DETAILED DESCRIPTION OF ILLUSTRATIVE EMBODIMENTS

Figure 1:
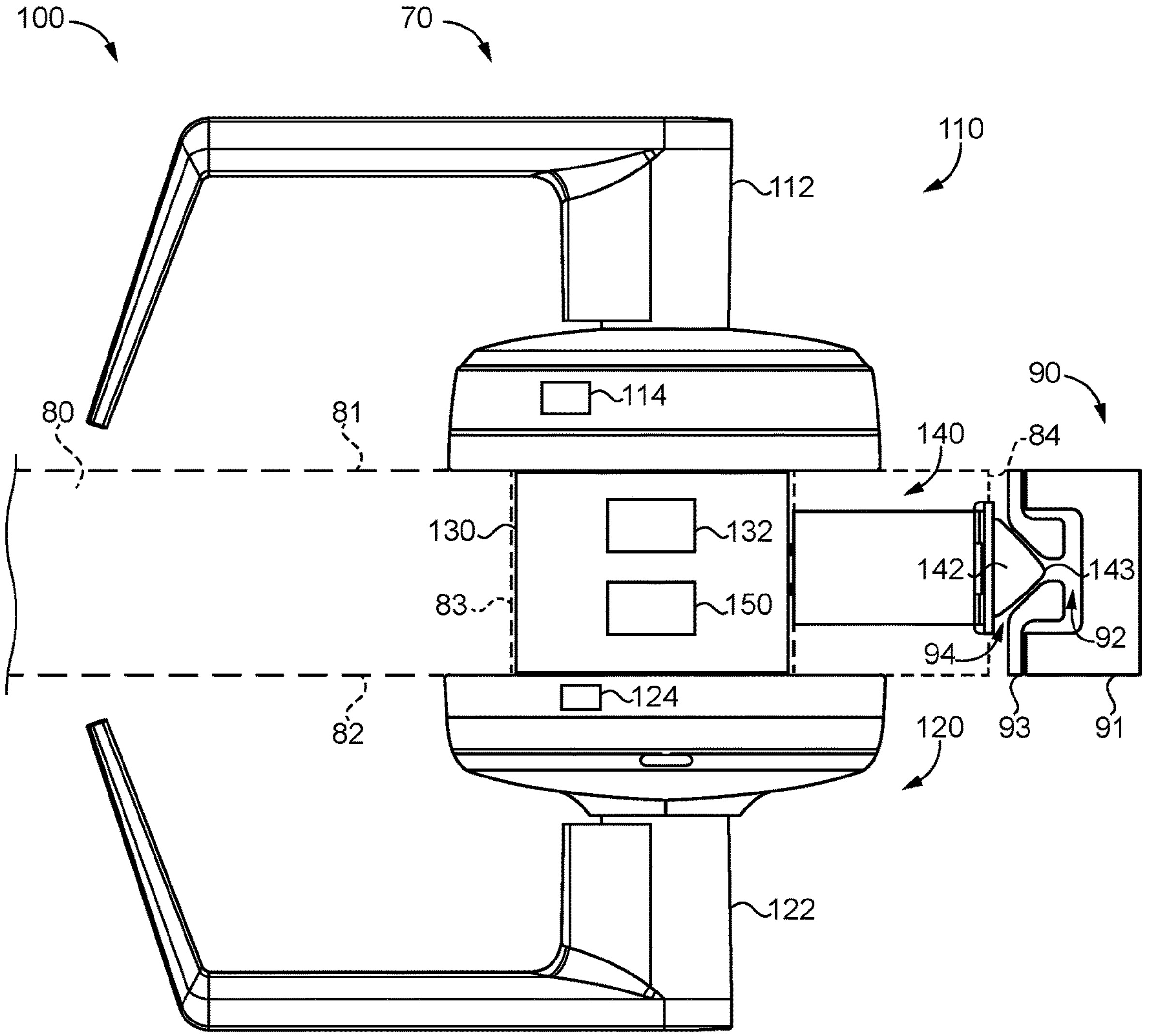
FIG. 1 is a plan view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown certain in specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a closure assembly 70 including a door 80, a doorframe 90, and a lockset 100 according to certain embodiments. The door 80 is swingingly mounted to the doorframe 90, and includes an inner side 81, an outer side 82, a cutout 83 extending between the inner side 81 and the outer side 82, and a free edge 84. The doorframe 90 includes a latch jamb 91 defining a pocket 92, and a strike plate 93 is mounted to the latch jamb 91 and defines a strike pocket 94, which in the illustrated form is tapered to closely engage the tapered nose 143 of the latchbolt 142.

The lockset 100 is mounted to the door 80, and generally includes an inside assembly 110 mounted to the inner side 81 of the door 80, an outside assembly 120 mounted to the outer side 82 of the door 80, a chassis 130 mounted within the cutout 83, a latchbolt assembly 140 operably connected with the chassis 130 and operable to extend beyond a swinging edge 84 of the door 80, and a control assembly 150 operable to transition the latchbolt assembly 140 between a locking state and an unlocking state. As described herein, the lockset 100 has a locked state in which the latchbolt assembly 140 is in its locking state and the door 80 cannot be opened from the outer side 82, and an unlocked state in which the latchbolt assembly 140 is in its unlocking state and the door 80 can be opened from the outer side 82.

The inside assembly 110 includes an inside actuator 112 that is operably connected to the chassis 130 such that the inside actuator 112 is at least selectively operable to actuate the latchbolt assembly 140. In the illustrated form, the inside actuator 112 is provided in the form of a handle, and more particularly as a lever. In other embodiments, the inside actuator 112 may be provided in another form, such as that of a knob, a thumbturn, a pushbar mechanism, a lock cylinder, or a fixed pull-handle. As described in further detail below, the inside actuator 112 is operably connected with the latchbolt assembly 140 via the chassis 130 such that the inside actuator is operable to drive a latchbolt 142 of the latchbolt assembly 140 from an extended position to a retracted position, even when the latchbolt assembly 140 is in its locking state. The inside assembly 110 further includes a lock state selector 114 operable to transition the lockset 100 between the locked state and the unlocked state. As described herein, the lock state selector 114 is connected with the control assembly 150 and is operable to cause the control assembly 150 to transition the latchbolt assembly 140 between its locking and unlocking states.

The outside assembly 120 includes an outside actuator 122 that, in the illustrated form, is provided in the form of a handle, and more particularly as a lever. In other embodiments, the outside actuator 122 may be provided in another form, such as that of a knob or a fixed pull-handle. The outside assembly 120 may further include a credential reader 124 in communication with the control assembly 150. The credential reader 124 may, for example, take the form of a card reader, a keypad, or a biometric credential reader. During operation of the lockset 100, presentation of an appropriate credential to the credential reader 124 (e.g., by inputting a code or presenting a card, a fob, or a biometric input) causes the control assembly 150 to transition the latchbolt assembly 140 from the locking state to the unlocking state. As described in further detail below, the outside assembly may further include a lock cylinder operably coupled with the latchbolt assembly 140 such that the lock cylinder is operable to mechanically override the electronic operation of the latchbolt assembly.

The chassis 130 is mounted within the door cutout 83 and includes a retractor 132 that connects the inside actuator 112 with the latchbolt assembly 140 such that the inside actuator 112 is operable to move the latchbolt assembly 140 from a locking state to an unlocking state. The chassis 130 may, for example, take the form of a mortise-format chassis, a cylindrical-format chassis, or a tubular-format chassis, the features of which will be readily apparent to those skilled in the art. In certain embodiments, the chassis 130 may be omitted, and the latchbolt assembly 140 may be directly connected with the inside actuator 112.

The latchbolt assembly 140 includes a latchbolt 142 having a projected position and a depressed position. With the latchbolt 142 in the projected position and the door 80 in the closed position, a nose 143 of the latchbolt 142 extends into the strike pocket 94. When the latchbolt assembly 140 is in the unlocking state, the latchbolt 142 is free to move from its projected position to its depressed position during push/pull operation of the door 80. Thus, when the door 80 is pushed or pulled toward its open position, the strike plate 93 contacts the nose 143 and urges the latchbolt 142 toward its depressed position. When the latchbolt assembly 140 is in the locking state, the latchbolt 142 is prevented from moving to its depressed position, but the latchbolt assembly 140 is capable of being moved to its unlocking state by operating the inside actuator 112. Thus, push/pull operation of the door 80 is prevented, but the latchbolt 142 is nonetheless capable of being depressed when the inside actuator 112 is manipulated appropriately.

As used herein, the term "push/pull operation of the door" indicates that the door 80 is merely being pushed or pulled without the user rotating or otherwise manipulating either manual actuator 112, 122. Thus, when push/pull operation of the door is enabled, the door 80 can be opened merely by pushing or pulling the door 80 without requiring the user to rotate or otherwise manipulate either manual actuator 112, 122.

Figure 2:
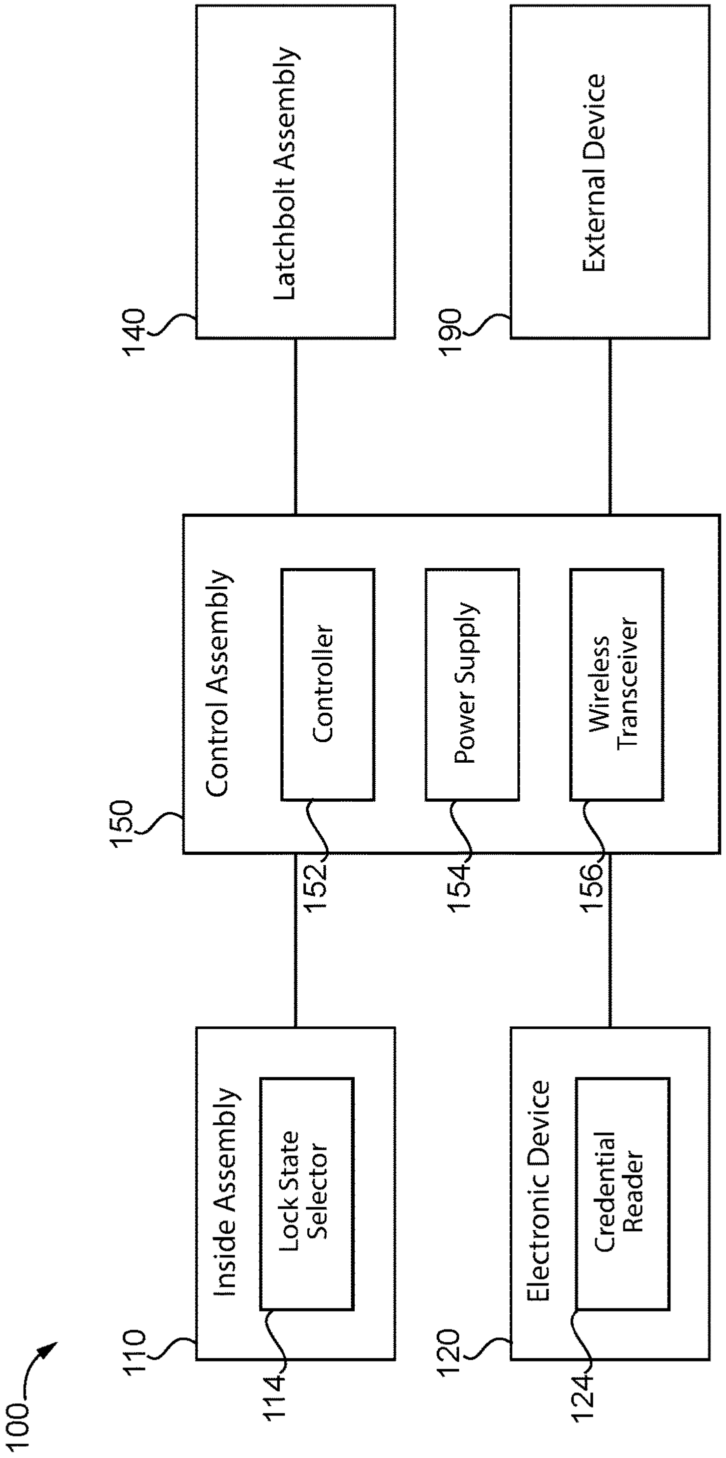
FIG. 2 is a schematic block diagram of the lockset illustrated in FIG. 1.

With additional reference to FIG. 2, the control assembly 150 includes a controller 152, and may further include an onboard power supply 154 and/or a wireless transceiver 156. The controller 152 is in communication with the latchbolt assembly 140, and is further in communication with at least one of the lock state selector 114 or the credential reader 124. The controller 152 is configured to control operation of the latchbolt assembly based in part upon information received from the lock state selector 114 and/or the credential reader 124. For example, when the lock state selector 114 is manipulated to lock or unlock the latchbolt assembly 140, the controller 152 may transmit a lock or unlock signal operative to transition the latchbolt assembly 140 to the appropriate state. As another example, when an appropriate credential is presented to the credential reader 124, the controller 152 may transmit an unlock signal that transitions the latchbolt assembly 140 from the locking state to the unlocking state to thereby permit push/pull operation of the door 80. The control assembly 150 may further be in communication with an external device 190 such as an access control system or a mobile device.

In certain embodiments, the inside assembly 110 includes a touch sensor (e.g., a capacitive touch sensor) in communication with the control assembly 150. For example, the lock state selector 114 may comprise the touch sensor, and may be installed to the inside actuator 112. In such forms, the control assembly 150 may cause the latchbolt assembly 140 to transition to the unlocked state in response to detecting a touch via the touch sensor. Such embodiments may provide for seamless and transparent push/pull operation from the inside of the door 80 while maintaining the door 80 in a locked state when no user is grasping the inside actuator 112. The inside assembly 110 may include a mechanical override feature (e.g., a thumbturn) to ensure functionality of the lockset 100 in the event of power failure. The outside assembly 120 may similarly include a mechanical override feature (e.g., a lock cylinder) in addition or as an alternative to the credential reader 124.

Figure 3:
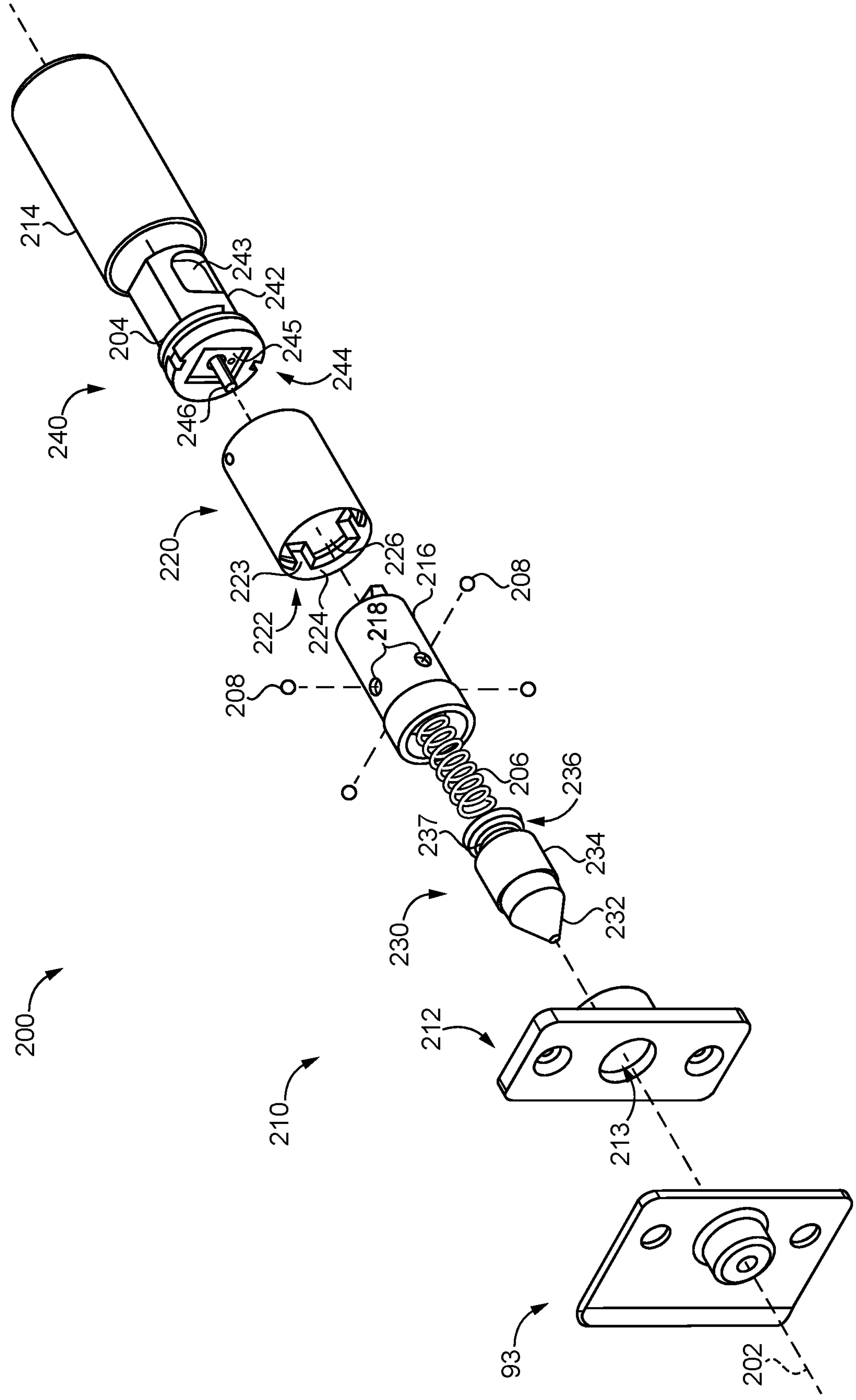
FIG. 3 is an exploded assembly view of a latchbolt assembly according to certain embodiments.

With additional reference to FIG. 3, illustrated therein is a latchbolt assembly 200 according to certain embodiments. The latchbolt assembly 200 may, for example, be utilized as the latchbolt assembly 140 of the above-described lockset 100. The latchbolt assembly 200 extends along a longitudinal axis 202 and includes a housing assembly 210, a locking sleeve 220 movably mounted to the housing assembly 210, a plunger or latchbolt 230 movably mounted to the housing assembly 210, and an actuator assembly 240 movably mounted to the housing assembly 210. The latchbolt assembly 200 further includes a first spring 204 biasing the actuator assembly 240 toward the locking sleeve 220, a second spring 206 biasing the latchbolt 230 toward a projected position, and a roller 208 engaged between the housing assembly 210, the locking sleeve 220, and the latchbolt 230.

The housing assembly 210 includes a faceplate 212, an outer housing 214 mounted to the faceplate 212, and an inner housing 216 mounted to the faceplate 212 and positioned within the outer housing 214. The faceplate 212 defines an opening 213, and is configured for mounting to the free edge 84 of the door 80. The outer housing 214 extends distally from the faceplate 212, and the locking sleeve 220 and the actuator assembly 240 are movably mounted within the outer housing 214. The inner housing 216 also extends distally from the faceplate 212, and the latchbolt 230 is movably mounted within the inner housing 216. The inner housing 216 includes an aperture 218 in which the roller 208 is seated. The first spring 204 is seated in the outer housing 214 and is engaged with the actuator assembly 240, and the second spring 206 is seated in the inner housing 216 and engaged with the latchbolt 230.

The latchbolt 230 is selectively movable relative to the inner housing 216 between a projected position and a depressed position. With the latchbolt 230 in its projected position and the door 80 is in its closed position, the latchbolt 230 projects into the strike pocket 94. In this state, the door 80 can be moved to the open position by moving the latchbolt 230 to its depressed position, which may be accomplished by urging the door 80 toward its open position such that the strike 93 urges the latchbolt 230 toward its depressed position. As described herein, movement of the latchbolt 230 from the projected position to the depressed position is selectively prevented by the locking sleeve 220 and the roller 208.

In the illustrated form, the roller 208 is generally spherical. In other embodiments, the roller 208 may be cylindrical or have another shape. Additionally, while four rollers 208 are illustrated in the Figures, it is to be appreciated that more or fewer rollers 208 may be utilized. In certain embodiments, the latchbolt assembly 200 may include a single roller 208. For ease and convenience of description, certain descriptions hereinafter will be made with reference to a single roller 208 and corresponding features. It is to be appreciated, however, that such descriptions may be equally applicable to embodiments in which the latchbolt assembly 200 includes plural rollers 208. For example, while the inner housing 216 is described herein as including an aperture 218 operable to receive the roller 208, such a description should also be appreciated to indicate that the inner housing 216 may include a plurality of apertures 218, each operable to receive a corresponding and respective one of a plurality of rollers 208.

Figure 4:
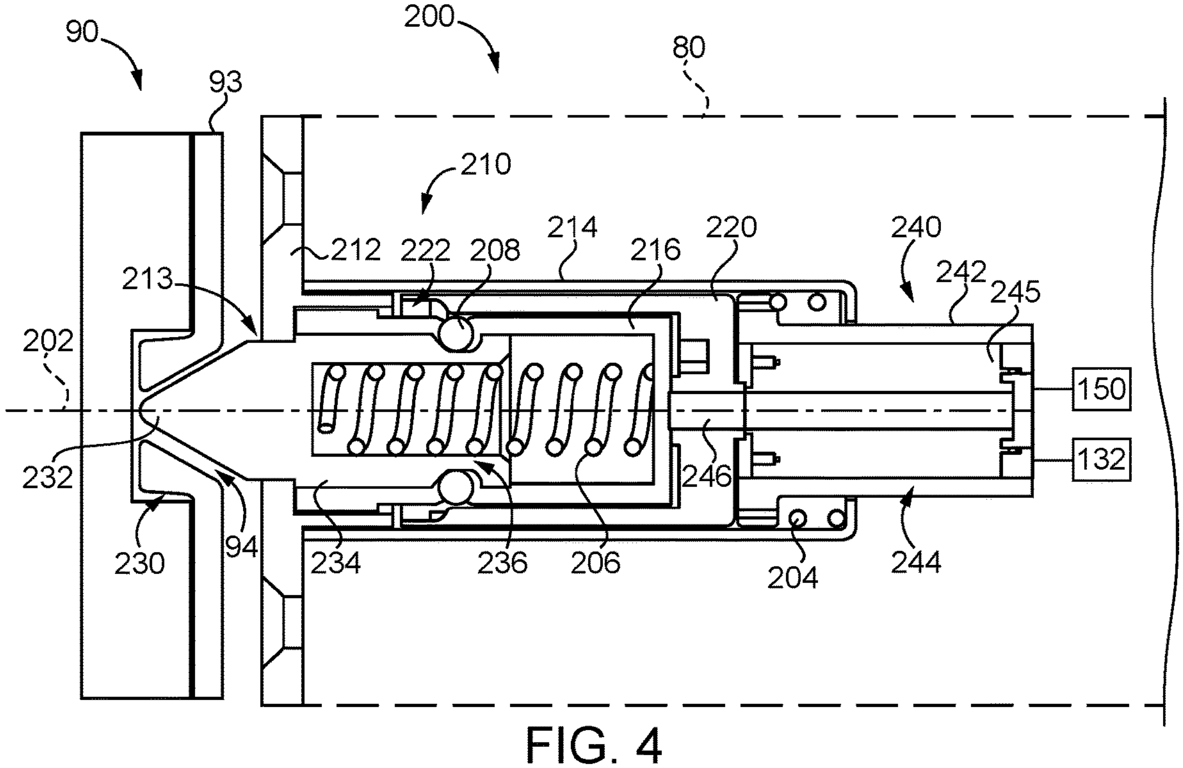
FIG. 4 is a cross-sectional illustration of the latchbolt assembly in a locking state.
Figure 5:
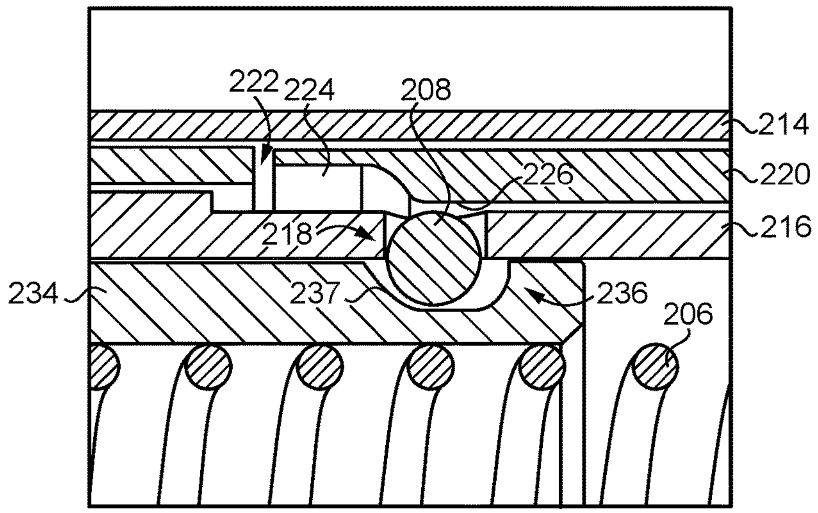
FIG. 5 is an enlarged view of a portion of FIG. 4.

The locking sleeve 220 is movably seated in the outer housing 210, and includes a recessed portion 222 (FIGS. 6 and 7) operable to partially receive the roller 208 and a blocking surface 226 (FIGS. 4 and 5) adjacent the recessed portion 222. The locking sleeve 220 is movable between a locking position and an unlocking position, and is driven between the locking position and the unlocking position by the electronic actuator 240. When the locking sleeve 220 is in the unlocking position, the recessed portion 222 is aligned with the roller 208, and the roller 208 is capable of being driven radially outward and partially into the recessed portion 222. When the locking sleeve 220 is in the locking position, the blocking surface 226 is aligned with the roller 208, and the blocking surface 226 prevents such radially-outward movement of the roller 208.

Figure 7:
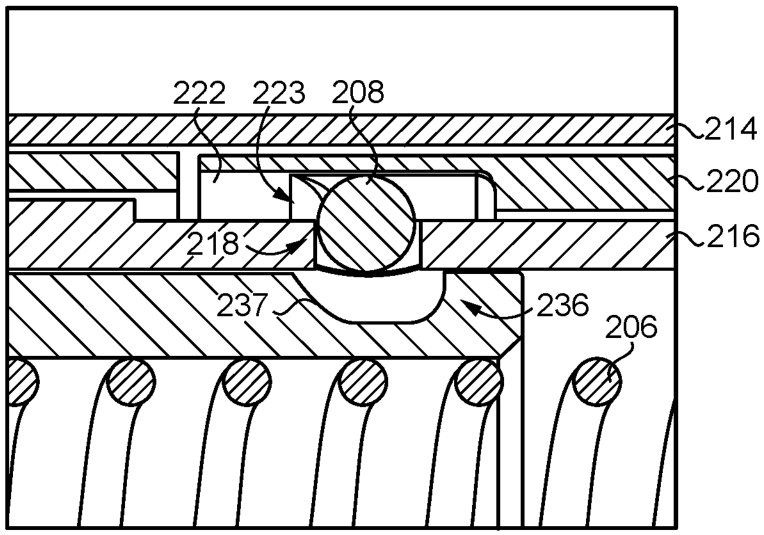
FIG. 7 is an enlarged view of a portion of FIG. 6.
Figure 8:
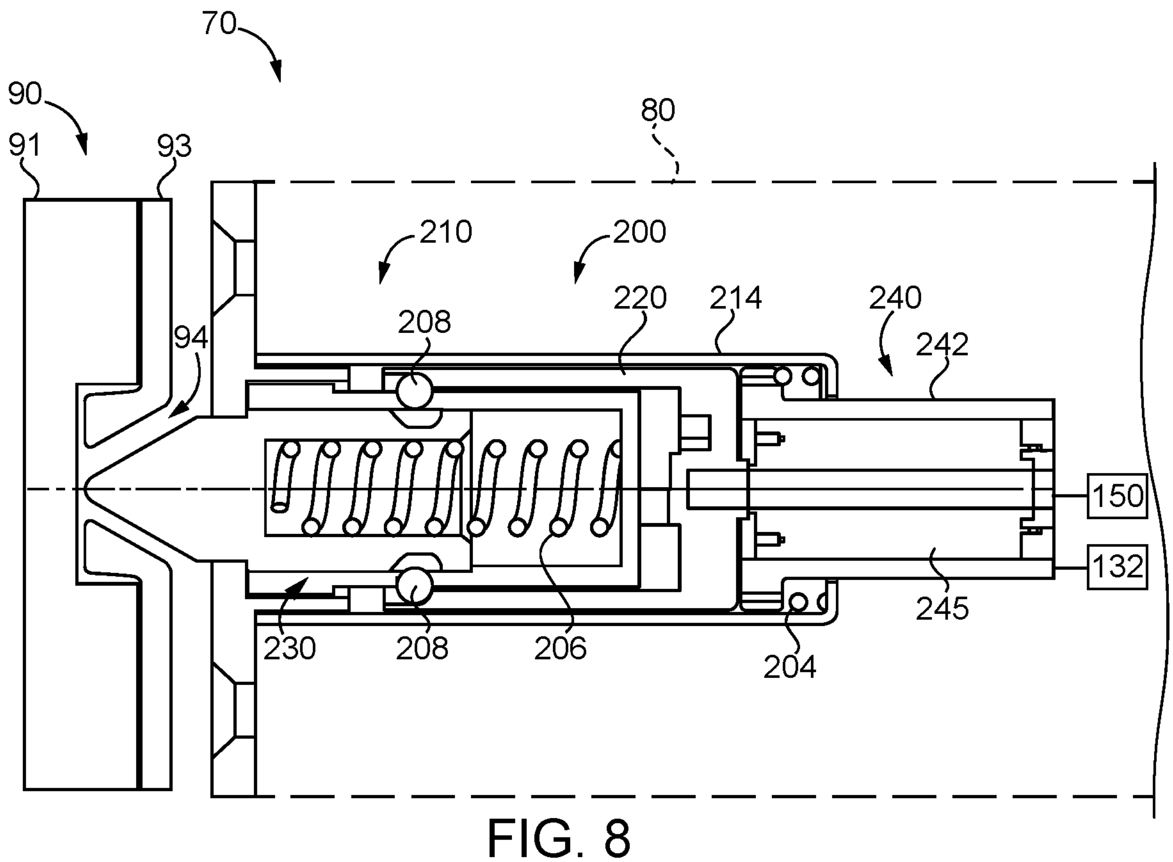
FIG. 8 is a cross-sectional illustration of the latchbolt assembly in a locking state.
Figure 9:
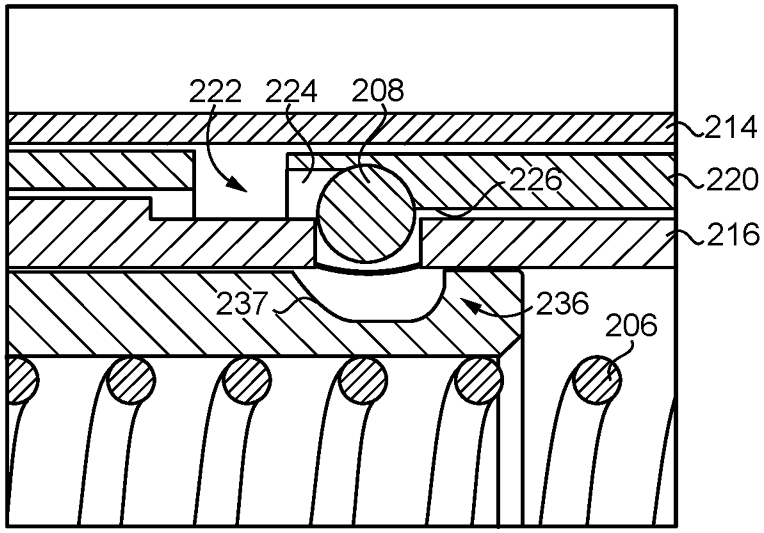
FIG. 9 is an enlarged view of a portion of FIG. 8.

In the illustrated form, the recessed portion 222 includes a first recess 223 and a second recess 224, which respectively correspond to a first unlocking position and a second unlocking position. More particularly, the first recess 223 is aligned with the roller 208 when the locking sleeve 220 is in the first unlocking position (FIGS. 6 and 7), and the second recess 224 is aligned with the roller 208 when the locking sleeve 220 is in the second locking position (FIGS. 8 and 9). As described herein, the locking sleeve 220 is electronically movable between the locking position and the first unlocking position, and is manually movably between the locking position and the second unlocking position. More particularly, the locking sleeve 220 is operable to rotate between the locking position and the first unlocking position under control of the control assembly 150, and is configured to linearly move between the locking position and the second unlocking position under control of the retractor 132.

The latchbolt 230 includes a nose 232, a body portion 234 from which the nose 232 extends, and an annular channel 236 formed in the body portion 234. Unlike traditional latchbolts, which have a tapered side and a flat side, the nose 232 includes two tapered sides. In certain forms, the nose 232 may be generally conical, while in other forms, the nose 232 may be wedge-shaped. The annular channel 236 is configured to partially receive the roller 208, and defines a ramp 237 configured to drive the roller 208 radially outward as the latchbolt 230 is urged from its projected position to its depressed position. When the roller 208 is blocked from moving to its radially-outward position, interference between the ramp 237 and the roller 208 prevents depression of the latchbolt 230, thereby retaining the latchbolt 230 in its projected position. In the illustrated form, the latchbolt 230 includes an annular channel 236 operable to partially received each of the rollers. In other embodiments, the latchbolt 230 may include one or more discrete dimples, each of which is operable to partially receive a corresponding and respective roller 208.

When the latchbolt 230 is in its projected position, the annular channel 236 is aligned with the aperture 218 and is operable to partially receive the roller 208. As the latchbolt 230 is urged toward its depressed position (e.g., by the strike 93 as the door 80 is urged from its closed position toward its open position), the ramp 237 urges the roller 208 radially outward. If the locking sleeve 220 is in either unlocking position when this occurs, the roller 208 is free to move radially outward and into the recessed portion 222. However, if the locking sleeve 220 is in the locking position when the latchbolt is urged toward its depressed position, the roller 208 instead contacts the blocking surface 226, which prevents radially outward movement of the roller 208, thereby preventing depression of the latchbolt 230. Thus, the locking sleeve 220 and the roller 208 cooperate to permit depression of the latchbolt 230 when the locking sleeve 220 is in either unlocking position, and retain the latchbolt 230 in its projected position when the locking sleeve 220 is in its locking position.

Figure 6:
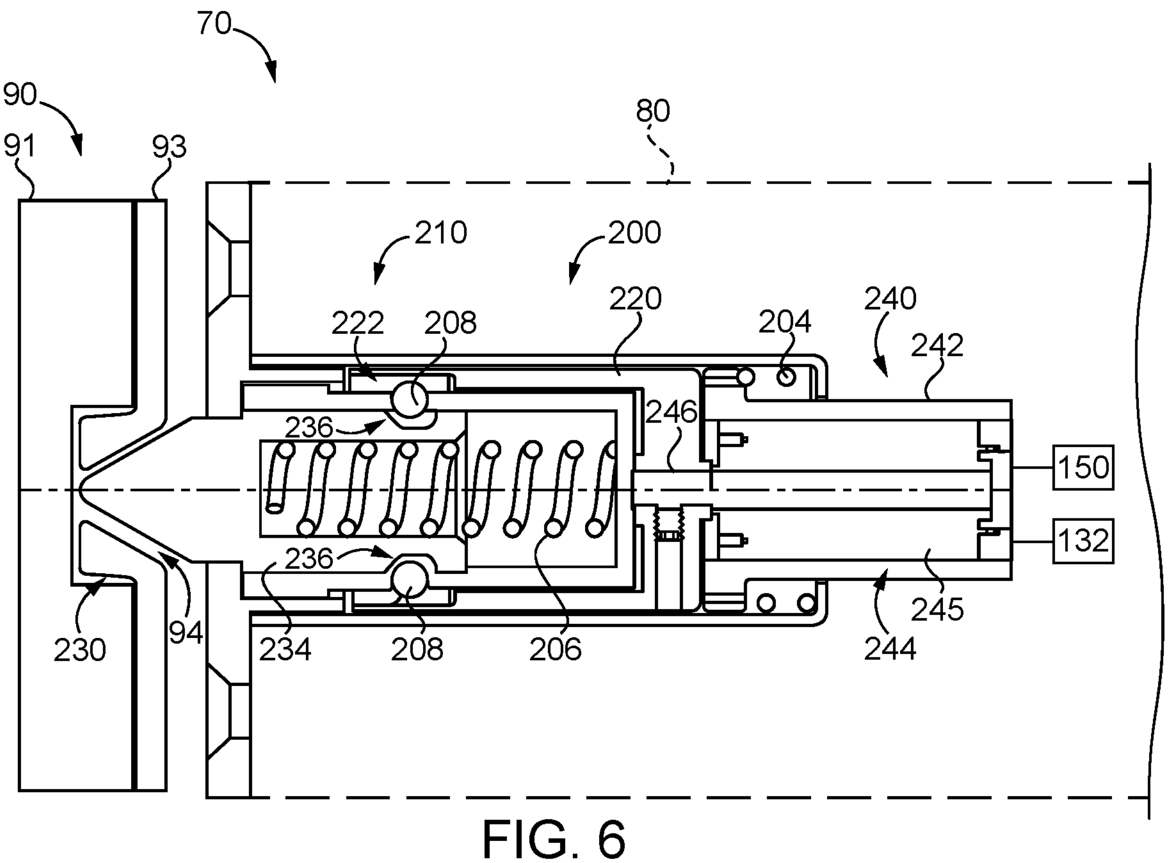
FIG. 6 is a cross-sectional illustration of the latchbolt assembly in a first unlocking state.

The actuator assembly 240 is seated in the outer housing 210, and generally includes an actuating sleeve 242 and a motor 244 including a body portion 245 and a shaft 246 that is engaged with the locking sleeve 220 such that the motor 244 is operable to rotate the locking sleeve 220. The actuator assembly 240 is operably connected with the locking sleeve 220 such that the actuator assembly 240 is operable to move the locking sleeve 220 between its locking position and its unlocking positions. The motor 244 is in communication with the control assembly 150 such that the control assembly 150 is operable to cause the motor 244 to rotate the locking sleeve 220 between its locking position (FIGS. 4 and 5) and its first unlocking position (FIGS. 6 and 7). Additionally, the actuating sleeve 242 is engaged with the retractor 132 such that the retractor 132 is operable to linearly drive the actuator assembly 240 to thereby move the locking sleeve 220 between its locking position (FIGS. 4 and 5) and its second unlocking position (FIGS. 8 and 9). As described herein, the actuating sleeve 242 includes one or more cam interfaces 243 that interface with a cam of the retractor 132 to provide for linear movement of the actuating sleeve 242 between its locking position and its second unlocking position.

The motor 244 is configured to drive the locking sleeve 220 from its locking position to its first unlocking position in response to an unlock signal received from the control assembly 150, and to drive the locking sleeve 220 from its first unlocking position to its locking position in response to a lock signal received from the control assembly 150. In the illustrated form, the motor 244 is provided in the form of a rotary motor, such as a stepping motor, and the body portion 245 is configured to rotate the output shaft 246 to rotate the locking sleeve 220 between its locking position and its first unlocking position. It is also contemplated that the motor 244 may be another form of rotary actuator, such as a rotary solenoid.

With additional reference to FIGS. 4-9, the latchbolt assembly 200 may be provided as the latchbolt assembly 140 of the lockset 100 within the closure assembly 70. During operation of such an embodiment of the lockset 100, the closure assembly 70 may begin with the door 80 in a closed position such that the nose 232 of the latchbolt 230 extends into the strike pocket 94. In this state, the latchbolt assembly 200 may be in a locking state (FIGS. 4 and 5) in which the latchbolt assembly 200 prevents push/pull operation of the door 80, may be in a first unlocking state (FIGS. 6 and 7) in which the latchbolt assembly 200 permits push/pull operation of the door 80, or may be in a second unlocking state (FIGS. 8 and 9) in which the latchbolt assembly 200 permits opening of the door 80.

With the door 80 in the closed position, the latchbolt assembly 200 may be in a locking state in which the latchbolt assembly 200 prevents push/pull operation of the door 80. In this state (FIGS. 4 and 5), the locking sleeve 220 is in its locking position, in which the blocking surface 226 is aligned with the aperture 218 and the roller 208. When push/pull operation of the door 80 is attempted, the strike plate 93 engages the tapered surface of the nose 232, thereby urging the latchbolt 230 from its projected position toward its depressed position. Such urging on the latchbolt 230 causes the ramp 237 to urge the roller 208 radially outward and into contact with the blocking surface 226. The blocking surface 226 prevents the radially outward movement of the roller 208, thereby preventing the depressing movement of the latchbolt 142.

With the door 80 in the closed position, the latchbolt assembly 200 may be in a first unlocking state in which the latchbolt assembly 200 permits push/pull operation of the door 80. In this state (FIGS. 6 and 7), the locking sleeve 220 is in its first unlocking position, in which the first recess 223 of the recessed portion 222 is aligned with the aperture 218 and operable to receive the roller 208. When push/pull operation of the door 80 is attempted, the strike plate 93 engages the tapered surface of the nose 232, thereby urging the latchbolt 230 from its projected position toward its depressed position. Such urging on the latchbolt 230 causes the ramp 237 to urge the roller 208 radially outward and into the recessed portion 222. As such, the roller 208 is capable of exiting the channel 236 to permit continued movement of the latchbolt 230 toward its depressed position, thereby enabling push/pull operation of the door 80. When the door 80 is moved from its open position toward its closed position, the second tapered side of the nose 232 engages the strike plate 93 such that the strike plate 93 urges the latchbolt 230 toward its depressed position to permit closing of the door 80. The latchbolt assembly 200 may then be returned to its locking state to once again prevent push/pull operation of the door 80.

When the latchbolt assembly 200 is in its locking state (FIGS. 4 and 5), push/pull operation of the door 80 is prevented in the manner described above. However, the latchbolt assembly 200 may nonetheless permit opening of the door 80 via a mechanical override, such as the inside actuator 112 or a lock cylinder installed to the outside assembly 120. For example, actuation of the inside actuator 112 or the lock cylinder may cause the retractor 132 to retract the actuator assembly 240 against the force of the first spring 204, thereby driving the locking sleeve 220 from its locking position to its second unlocking position. In this state (FIGS. 8 and 9), the second recess 224 of the recessed portion 222 is aligned with the roller 208. As a result, the second recess 224 receives the roller 208 as the ramp 237 to urges the roller 208 radially outward during depression of the latchbolt 230, thereby permitting depression of the latchbolt 230 and enabling opening of the door 80.

Figure 10:
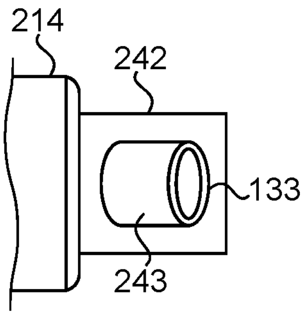
FIG. 10 illustrates a cam interface with a cam in a home position
Figure 11:
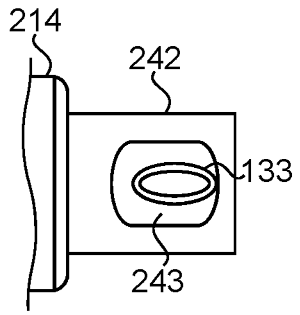
FIG. 11 illustrates the cam interface with the cam in a rotated position.

With additional reference to FIGS. 10 and 11, illustrated therein is a cam interface 243 according to certain embodiments. As noted above, the actuating sleeve 242 includes the cam interface 243, which interfaces with the retractor 132 to provide for manual override when the latchbolt assembly 200 is in the locked state. The retractor 132 includes a rotatable cam 133 that is configured to rotate in response to actuation of a manual actuator, such as the inside actuator 112. The engagement between the cam 133 and the cam interface 243 is configured to cause linear movement of the actuating sleeve 242 in response to rotation of the cam 133. Thus, rotation of the cam 133 from a home position (FIG. 10) to a rotated position (FIG. 13) moves the locking sleeve 220 from the locking position to the second unlocking position in the manner described above.

In certain embodiments, the cam 133 may be coupled to a spindle or a tailpiece of a mechanical override such that the mechanical override is operable to unlock the latchbolt assembly 200 regardless of whether the control assembly 150 has placed the latchbolt assembly 200 in the unlocked state. As one example, the mechanical override may include the inner actuator 112, such as a rotatable handle or thumbturn. Additionally or alternatively, the mechanical override may include a lock cylinder, such as one included in the outside assembly 120. In either event, actuation of the mechanical override serves to move the locking sleeve 220 from its locked position to its second unlocking position in the manner described above.

Figure 12:
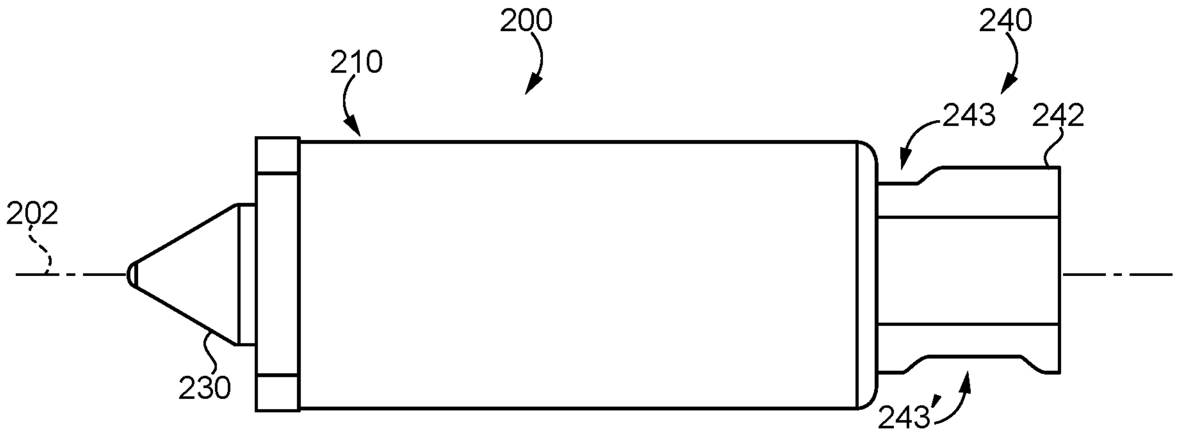
FIG. 12 is a plan view of the latchbolt assembly.

With additional reference to FIG. 12, the actuating sleeve 242 may include plural cam interfaces, such as a first cam interface 243 and a second cam interface 243' positioned on opposite sides of the actuating sleeve 242. The first cam interface 243 and the second cam interface 243' have different positions along the longitudinal axis 202 to facilitate installation of the latchbolt assembly 200 with two different standard backset distances. For example, when the backset distance is selected as a lesser backset distance, the latchbolt assembly 200 may be installed in a first orientation in which the first cam interface 243 is engaged with the cam 133 to provide for retraction of the locking sleeve 220 by the inside actuator 112. Conversely, when the backset distance is selected as a greater backset distance, the latchbolt assembly 200 may be installed in a second orientation in which the second cam interface 243' is engaged with the cam 133 to provide for retraction of the locking sleeve 220 by the inside actuator 112.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A latchbolt assembly, comprising:

a housing configured for mounting to a door;

a latchbolt mounted in the housing for axial movement along a longitudinal axis between a projected position and a depressed position relative to the housing;

a roller engaged with the latchbolt such that the axial movement of the latchbolt from the projected position to the depressed position engages a drive surface of the latchbolt against the roller to urge the roller from a first position toward a second position; and a locking sleeve movably mounted to the housing for movement relative to an axis via one or more actuators, the locking sleeve having at least one recess operable to partially receive the roller, and the locking sleeve having a blocking surface operable to engage the roller to prevent movement of the roller from the first position to the second position;

wherein the locking sleeve is displaced relative to the axis between a locking position in which the blocking surface is aligned with the roller and engages the roller to prevent movement of the roller from the first position to the second position and thereby retain the latchbolt in the projected position, and at least one unlocking position in which the at least one recess is aligned with the roller to permit movement of the roller from the first position to the second position and into the at least one recess to thereby enable depression of the latchbolt; and wherein the locking sleeve is rotatably mounted to the housing for rotation about the axis via the one or more actuators, wherein the locking sleeve rotates about the rotational axis between the locking position and the unlocking position, wherein the one or more actuators comprises a motor including a shaft coupled with the locking sleeve and a body portion operable to rotate the shaft, and wherein rotation of the shaft by the body portion moves the locking sleeve between the locking position and the unlocking position.

2. The latchbolt assembly of claim 1, wherein the locking sleeve is slidably mounted to the housing for axial movement along the axis via the one or more actuators; and wherein the locking sleeve is axially displaced along the axis between the locking position and a second unlocking position.

3. The latchbolt assembly of claim 1, wherein the at least one recess of the locking sleeve comprises a first recess and a second recess; and wherein the at least one unlocking position includes a first unlocking position in which the first recess is aligned with the roller in response to rotation of the locking sleeve about the axis to permit movement of the roller and into the first recess to thereby enable depression of the latchbolt.

4. The latchbolt assembly of claim 3, wherein the locking sleeve is slidably mounted to the housing for axial movement along the axis via the one or more actuators; and wherein the at least one unlocking position includes a second unlocking position in which the second recess is aligned with the roller in response to axial movement of the locking sleeve along the axis to permit movement of the roller into the second recess to thereby enable depression of the latchbolt.

5. The latchbolt assembly of claim 4, wherein the one or more actuators further comprises a retractor that imparts linear movement of the body and the shaft to cause linear movement of the locking sleeve between the locking position and the second unlocking position.

6. A lockset including the latchbolt assembly of claim 5, further comprising:

a control assembly in communication with the motor, wherein the control assembly is configured to cause the motor to rotate the shaft to electronically transition the lockset between a locked state and an unlocked state; and a manual actuator operably connected with the locking sleeve and operable to linearly move the locking sleeve to manually transition the lockset between the locked state and the unlocked state;

wherein with the lockset in the locked state, the latchbolt is retained in the projected position; and wherein with the lockset in the unlocked state, the latchbolt is operable to move between the projected position and the depressed position.

7. The latchbolt assembly of claim 4, further comprising a spring linearly biasing the locking sleeve away from the second unlocking position and toward the locking position.

8. The latchbolt assembly of claim 1, wherein the first position is a radially-inner position, and wherein the second position is a radially-outer position.

9. The latchbolt assembly of claim 8, wherein the drive surface of the latchbolt comprises a ramped surface configured to urge the roller from the radially-inner position to the radially-outer position as the latchbolt moves from the projected position toward the depressed position.

10. The latchbolt assembly of claim 1, wherein the latchbolt includes a conical nose.

11. A latchbolt assembly, comprising:

a housing configured for mounting to a door;

a latchbolt mounted in the housing for axial movement along a longitudinal axis between a projected position and a depressed position relative to the housing;

a roller engaged with the latchbolt such that the axial movement of the latchbolt from the projected position to the depressed position engages a drive surface of the latchbolt against the roller to urge the roller from a first position toward a second position; and a locking sleeve movably mounted to the housing for movement relative to an axis via one or more actuators, the locking sleeve having at least one recess operable to partially receive the roller, and the locking sleeve having a blocking surface operable to engage the roller to prevent movement of the roller from the first position to the second position;

wherein the locking sleeve is displaced relative to the axis between a locking position in which the blocking surface is aligned with the roller and engages the roller to prevent movement of the roller from the first position to the second position and thereby retain the latchbolt in the projected position, and at least one unlocking position in which the at least one recess is aligned with the roller to permit movement of the roller from the first position to the second position and into the at least one recess to thereby enable depression of the latchbolt; and wherein the locking sleeve is slidably mounted to the housing for axial movement along the axis via the one or more actuators, and wherein the locking sleeve is axially displaced along the axis between the locking position and the unlocking position.

12. The latchbolt assembly of claim 11, wherein the locking sleeve is rotatably mounted to the housing for rotation about the axis via the one or more actuators; and wherein the locking sleeve rotates about the rotational axis between the locking position and a second unlocking position.

13. The latchbolt assembly of claim 12, wherein the one or more actuators comprises a motor including a shaft coupled with the locking sleeve and a body portion operable to rotate the shaft, wherein rotation of the shaft by the body portion moves the locking sleeve between the locking position and the second unlocking position.

14. The latchbolt assembly of claim 11, wherein the one or more actuators further comprises a retractor that imparts linear movement of the locking sleeve between the locking position and the unlocking position.

15. A latchbolt assembly, comprising:

a housing assembly comprising an aperture;

a roller seated in the aperture for movement between a first position and a second position;

a latchbolt mounted to the housing assembly for axial movement along a longitudinal axis between a projected position and a depressed position relative to the housing assembly, wherein the latchbolt includes a ramped surface that engages the roller to urge the roller from the first position toward the second position as the latchbolt moves from the projected position toward the depressed position, and wherein engagement between the ramped surface and the roller prevents movement of the latchbolt from the projected position to the depressed position when the roller is in the first position, and wherein the roller permits movement of the latchbolt from the projected position to the depressed position when the roller is in the second position; and a locking sleeve movably mounted between an inner housing and an outer housing of the housing assembly;

wherein the locking sleeve is configured to be driven between a locking position and at least one unlocking position via at least one actuator, wherein a blocking surface of the locking sleeve is aligned with the roller and engages the roller when the locking sleeve is in the locking position to prevent movement of the roller from the first position to the second position and thereby retain the latchbolt in the projected position, and wherein at least one recess of the locking sleeve is aligned with the roller when the locking sleeve is in the unlocking position to receive the roller and permit movement of the roller from the first position to the second position to thereby enable depression of the latchbolt; and wherein the locking sleeve is configured to be linearly driven between the locking position and the at least one unlocking position via the at least one actuator.

16. The latchbolt assembly of claim 15, wherein the at least one actuator comprises a retractor that imparts linear movement of the locking sleeve between the locking position and the at least one unlocking position.

17. The latchbolt assembly of claim 15, wherein the at least one actuator comprises a rotatory actuator, and wherein the locking sleeve is configured to be rotationally driven between the locking position and a second unlocking position via the rotary actuator.

18. A latchbolt assembly, comprising:

a housing assembly comprising an aperture;

a roller seated in the aperture for movement between a first position and a second position;

a latchbolt mounted to the housing assembly for axial movement along a longitudinal axis between a projected position and a depressed position relative to the housing assembly, wherein the latchbolt includes a ramped surface that engages the roller to urge the roller from the first position toward the second position as the latchbolt moves from the projected position toward the depressed position, and wherein engagement between the ramped surface and the roller prevents movement of the latchbolt from the projected position to the depressed position when the roller is in the first position, and wherein the roller permits movement of the latchbolt from the projected position to the depressed position when the roller is in the second position; and a locking sleeve movably mounted between an inner housing and an outer housing of the housing assembly;

wherein the locking sleeve is configured to be driven between a locking position and at least one unlocking position via at least one actuator, wherein a blocking surface of the locking sleeve is aligned with the roller and engages the roller when the locking sleeve is in the locking position to prevent movement of the roller from the first position to the second position and thereby retain the latchbolt in the projected position, and wherein at least one recess of the locking sleeve is aligned with the roller when the locking sleeve is in the unlocking position to receive the roller and permit movement of the roller from the first position to the second position to thereby enable depression of the latchbolt;

wherein the at least one recess of the locking sleeve comprises a first recess and a second recess, and wherein the unlocking position comprises a first unlocking position and a second unlocking positon;

wherein the locking sleeve is configured to be linearly driven via the at least one actuator to the first unlocking position wherein the first recess of the locking sleeve is aligned with the roller to permit movement of the roller from the first position to the second position and into the first recess to thereby enable depression of the latchbolt; and wherein the locking sleeve is configured to be rotated via the at least one actuator to the second unlocking position wherein the second recess of the locking sleeve is aligned with the roller to permit movement of the roller from the first position to the second position and into the second recess to thereby enable depression of the latchbolt.

19. The latchbolt assembly of claim 18, wherein the at least one actuator comprises a linear actuator and a rotatory actuator;

wherein the linear actuator linearly displaces the locking sleeve to the first unlocking position; and wherein the rotary actuator rotationally displaces the locking sleeve to the second unlocking position.

20. A latchbolt assembly, comprising:

a housing assembly comprising an aperture;

a roller seated in the aperture for movement between a first position and a second position;

a latchbolt mounted to the housing assembly for axial movement along a longitudinal axis between a projected position and a depressed position relative to the housing assembly, wherein the latchbolt includes a ramped surface that engages the roller to urge the roller from the first position toward the second position as the latchbolt moves from the projected position toward the depressed position, and wherein engagement between the ramped surface and the roller prevents movement of the latchbolt from the projected position to the depressed position when the roller is in the first position, and wherein the roller permits movement of the latchbolt from the projected position to the depressed position when the roller is in the second position; and a locking sleeve movably mounted between an inner housing and an outer housing of the housing assembly;

wherein the locking sleeve is configured to be driven between a locking position and at least one unlocking position via at least one actuator, wherein the at least one actuator comprises a linear actuator and a rotatory actuator, wherein a blocking surface of the locking sleeve is aligned with the roller and engages the roller when the locking sleeve is in the locking position to prevent movement of the roller from the first position to the second position and thereby retain the latchbolt in the projected position, and wherein at least one recess of the locking sleeve is aligned with the roller when the locking sleeve is in the unlocking position to receive the roller and permit movement of the roller from the first position to the second position to thereby enable depression of the latchbolt;

wherein the unlocking position of the locking sleeve comprises a first unlocking position and a second unlocking positon;

wherein the linear actuator linearly displaces the locking sleeve to the first unlocking position; and wherein the rotary actuator rotationally displaces the locking sleeve to the second unlocking position.

* * * * *